US012260338B2

United States Patent
Jiao et al.

(10) Patent No.: US 12,260,338 B2
(45) Date of Patent: Mar. 25, 2025

(54) TRANSFORMER-BASED NEURAL NETWORK INCLUDING A MASK ATTENTION NETWORK

(71) Applicant: Microsoft Technology Licensing, LLC, Redmond, WA (US)

(72) Inventors: Jian Jiao, Bellevue, WA (US); Yeyun Gong, Beijing (CN); Nan Duan, Beijing (CN); Ruofei Zhang, Mountain View, CA (US); Ming Zhou, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 1016 days.

(21) Appl. No.: 17/005,067

(22) Filed: Aug. 27, 2020

(65) Prior Publication Data
US 2022/0067533 A1 Mar. 3, 2022

(51) Int. Cl.
*G06N 3/088* (2023.01)
*G06N 3/045* (2023.01)
*G06N 3/063* (2023.01)

(52) U.S. Cl.
CPC .............. *G06N 3/088* (2013.01); *G06N 3/045* (2023.01); *G06N 3/063* (2013.01)

(58) Field of Classification Search
CPC ......... G06N 3/088; G06N 3/045; G06N 3/063
See application file for complete search history.

(56) References Cited

U.S. PATENT DOCUMENTS

| 2019/0130273 | A1* | 5/2019 | Keskar | G06N 3/044 |
| 2020/0410337 | A1* | 12/2020 | Huang | G06N 3/04 |
| 2021/0049236 | A1* | 2/2021 | Nguyen | G06F 40/205 |
| 2021/0158206 | A1* | 5/2021 | Klein | G06F 40/30 |
| 2021/0383199 | A1* | 12/2021 | Weissenborn | G06N 3/063 |

OTHER PUBLICATIONS

Im et al. (Distance-based Self-Attention Network for Natural Language Inference, arXiv:1712.02047v1 [cs.CL] Dec. 6, 2017 (Year: 2017).*
Luo et al. (Simplified Self-Attention for Transformer-based End-to-End Speech Recognition, arXiv:2005.10463v1 [cs.SD] May 21, 2020) (Year: 2020).*

(Continued)

*Primary Examiner* — Li B. Zhen
*Assistant Examiner* — Moriam Mosunmola Godo

(57) ABSTRACT

A transformer-based neural network includes at least one mask attention network (MAN). The MAN computes an original attention data structure that expresses influence between pairs of data items in a sequence of data items. The MAN then modifies the original data structure by mask values in a mask data structure, to produce a modified attention data structure. Compared to the original attention data structure, the modified attention data structure better accounts for the influence of neighboring data items in the sequence of data items, given a particular data item under consideration. The mask data structure used by the MAN can have static and/or machine-trained mask values. In one implementation, the transformer-based neural network includes at least one MAN in combination with at least one other attention network that does not use a mask data structure, and at least one feed-forward neural network.

20 Claims, 8 Drawing Sheets

(56) References Cited

OTHER PUBLICATIONS

Liu et al. ("Text Summarization with Pretrained Encoders", arXiv:1908.08345v2 [cs.CL] Sep. 5, 2019) (Year: 2019).*
Fan, et al., "Mask Attention Networks: Rethinking and Strengthen Transformer," arXiv:2103.13597v1 [cs.CL], Mar. 25, 2021, 10 pages.
Guo, et al., "Gaussian Transformer: A Lightweight Approach for Natural Language Inference," in Proceedings of the Thirty-Third AAAI Conference on Artificial Intelligence (AAAI-19), vol. 33, Jul. 2019, pp. 6489-6496.
Paulus, et al., "A Deep Reinforced Model for Abstractive Summarization," arXiv:1705.04304v3 [cs.CL], Nov. 13, 2017, 12 pages.
Bugliarello, et al., "Improving Neural Machine Translation with Parent-Scaled Self-Attention," arXiv:1909.03149v1 [cs.CL], Sep. 6, 2019, 8 pages.
Im, et al., "Distance-based Self-Attention Network for Natural Language Inference," arXiv e-print, arXiv:1712.02047v1 [cs.CL], Dec. 6, 2017, 12 pages.
Sperber, et al., "Self-Attentional Models for Lattice Inputs," arXiv e-print, arXiv:1906.01617v1 [cs.CL], Jun. 4, 2019, 13 pages.
Duan, et al., "Attention Is All You Need for Chinese Word Segmentation," arXiv e-print, arXiv:1910.14537v3 [cs.CL], Oct. 6, 2020, 11 pages.
Shen, et al., "DiSAN: Directional Self-Attention Network for RNN/CNN-Free Language Understanding," arXiv e-print, arXiv:1709.04696v3 [cs.CL], Nov. 20, 2017, 10 pages.
Fan, et al., "Mask Attention Networks: Rethinking and Strengthen Transformer," in Proceedings of the 2021 Conference of the North American Chapter of the Association for Computational Linguistics: Human Language Technologies, Jun. 2021, pp. 1692-1701.
PCT Search Report and Written Opinion for PCT/US2021/032840, mailed on Aug. 26, 2021, 17 pages.
Ahmed, et al., "Weighted Transformer Network for Machine Translation," arXiv:1711.02132v1 [cs.AI], Nov. 6, 2017, 10 pages.
Banerjee, et al., "Meteor: An Automatic Metric for MT Evaluation with Improved Correlation with Human Judgments," in Proceedings of the ACL Workshop on Intrinsic and Extrinsic Evaluation Measures for Machine Translation and/or Summarization, Jun. 2005, pp. 65-72.
Bugliarello, et al., "Enhancing Machine Translation with Dependency-Aware Self-Attention," arXiv:1909.03149v3 [cs.CL], Apr. 21, 2020, 10 pages.
Dai, et al., "Transformer-XL: Attentive Language Models Beyond a Fixed-Length Context," in Proceedings of the 57th Annual Meeting of the Association for Computational Linguistics, Jul. 2019, pp. 2978-2988.
Devlin, et la., "BERT: Pre-training of Deep Bidirectional Transformers for Language Understanding," in Proceedings of the 2019 Conference of the North American Chapter of the Association for Computational Linguistics: Human Language Technologies, Jun. 2019, pp. 4171-4186.
Du, et al., "Learning to Ask: Neural Question Generation for Reading Comprehension," in Proceedings of the 55th Annual Meeting of the Association for Computational Linguistics, Jul. 2017, pp. 1342-1352.
Edunov, et al., "Pre-trained Language Model Representations for Language Generation," in Proceedings of the 2019 Conference of the North American Chapter of the Association for Computational Linguistics: Human Language Technologies, Jun. 2019, pp. 4052-4059.
Hao, et al., "Modeling Recurrence for Transformer," in Proceedings of the 2019 Conference of the North American Chapter of the Association for Computational Linguistics, Jun. 2019, pp. 1198-1207.
Langley, Pat, "Crafting Papers on Machine Learning," in Proceedings of the 17th International Conference on Machine Learning (ICML 2000), Jun. 2000, 6 pages.
Lin, et al., "Automatic Evaluation of Summaries Using N-gram Co-occurrence Statistics," in Proceedings of the 2003 Conference of the North American Chapter of the Association for Computational Linguistics on Human Language Technology, 2003, pp. 71-78.
Liu, et al., "Text Summarization with Pretrained Encoders," in Proceedings of the 2019 Conference on Empirical Methods in Natural Language Processing and the 9th International Joint Conference on Natural Language Processing (EMNLP-IJCNLP), Nov. 2019, pp. 3730-3740.
Lu, et al., "Understanding and Improving Transformer from a Multi-particle Dynamic System Point of View," arXiv:1906.02762v1 [cs.LG], Jun. 6, 2019, 15 pages.
Ma, et al., "Monotonic Multihead Attention," arXiv:1909.12406v1 [cs.CL], Sep. 26, 2019, 11 pages.
Nallapati, et al., "Abstractive Text Summarization Using Sequence-to-Sequence RNNs and Beyond," in Proceedings of The 20th SIGNLL Conference on Computational Natural Language Learning, Aug. 2016, pp. 280-290.
Ott, et al., "Scaling Neural Machine Translation," in Proceedings of the Third Conference on Machine Translation (WMT), vol. 1: Research Papers, 2018, pp. 1-9.
Papineni, et al., "Bleu: A Method for Automatic Evaluation of Machine Translation," in Proceedings of the 40th Annual Meeting on Association for Computational Linguistics, Jul. 2002, pp. 311-318.
Radford, et al., "Language Models are Unsupervised Multitask Learners," available at https://openai.com/blog/better-language-models/, in Technical Report, OpenAi, Feb. 2019, 24 pages.
Rajpurkar, "Know What You Don't Know: Unanswerable Questions for SQuAD," in Proceedings of the 56th Annual Meeting of the Association for Computational Linguistics, Jul. 2018, pp. 784-789.
Rush, et al., "A Neural Attention Model for Abstractive Sentence Summarization," in Proceedings of the 2015 Conference on Empirical Methods in Natural Language Processing, Sep. 2015, pp. 379-389.
See, et al., "Get to the Point: Summarization with Pointer-generator Networks," arXiv:1704.04368v2 [cs.CL], Apr. 25, 2017, 20 pages.
Shaw, et al., "Self-Attention with Relative Position Representations," in Proceedings of the 2018 Conference of the North American Chapter of the Association for Computational Linguistics: Human Language Technologies, Jun. 2018, pp. 464-468.
Song, et al., "Mass: Masked Sequence to Sequence Pre-training for Language Generation," arXiv:1905.02450v5 [cs. CL], Jun. 21, 2019, 11 pages.
Sukhbaatar, et al., "Adaptive Attention Span in Transformers," in Proceedings of the 57th Annual Meeting of the Association for Computational Linguistics, Jul. 2019, pp. 331-335.
Sukhbaatar, et al., "Augmenting Self-attention with Persistent Memory," arXiv:1907.01470v1 [cs.LG], Jul. 2, 2019, 11 pages.
Vaswani, et al., "Attention is All You Need," in Advances in Neural Information Processing Systems 30, 2017, pp. 5998-6008.
Wu, et al., "Pay Less Attention with Lightweight and Dynamic Convolutions," arXiv:1901.10430v2 [cs.CL], Feb. 22, 2019, 14 pages.
Yang, et al., "Context-Aware Self-Attention Networks," in Proceedings of the AAAI Conference on Artificial Intelligence, vol. 33, Oct. 2018, pp. 387-394.
Yang, et al., "Modeling Localness for Self-attention Networks," in Proceedings of the 2018 Conference on Empirical Methods in Natural Language Processing, 2018, pp. 4449-4458.
Yang, et al., "Convolutional Self-Attention Networks," arXiv:1904.03107v1 [cs.CL]. Apr. 5, 2019, 7 pages.
Zhang, et al., "Pretraining-Based Natural Language Generation for Text Summarization," in Proceedings of the 23rd Conference on Computational Natural Language Learning, Nov. 2019, pp. 789-797.
Zhang, et al., "Addressing Semantic Drift in Question Generation for Semi-supervised Question Answering," in Proceedings of the 2019 Conference on Empirical Methods in Natural Language Processing and the 9th International Joint Conference on Natural Language Processing, Nov. 2019, pp. 2495-2509.
Zhao., et la., "Muse: Parallel Multi-scale Attention for Sequence to Sequence Learning," arXiv:1911.09483v1 [cs.CL], Nov. 17, 2019, 12 pages.

(56) References Cited

OTHER PUBLICATIONS

Zhu, et al., "Aligning Books and Movies: Towards Story-like Visual Explanations by Watching Movies and Reading Books," in ICCV '15: Proceedings of the 2015 IEEE International Conference on Computer Vision (ICCV), Dec. 2015, CVF reprint available at https://www.cv-foundation.org/openaccess/content_iccv_2015/papers/Zhu_Aligning_Books_and_ICCV_2015_paper.pdf, 9 pages.

PCT Search Report and Written Opinion for PCT/US2021/028293, mailed on Jul. 30, 2021, 17 pages.

Camastra, et al., "Machine Learning-Based Web Documents Categorization by Semantic Graphs," available at https://www.researchgate.net/publication/278029875_Machine_Learning-Based_Web_Documents_Categorization_by_Semantic_Graphs, in Advances in Neural Networks: Computational and Theoretical Issues, Smart Innovation, Systems and Technologies, Springer, vol. 37, 2015, 9 pages.

Mishra, Piyush, "Opinion: Transformers Have a Size Problem," available at https://medium.com/roundtableml/opinion-transformers-have-a-size-problem-91fcea9178f, in Medium, Jun. 13, 2023, 15 pages.

Kulkarni, Ninad, "Attention Mechanism: From Words to Understanding," available https://bootcamp.uxdesign.cc/attention-mechanism-from-words-to-understanding-eda8683f6a94, in Bootcamp, Jun. 2, 2023, 14 pages.

Sanh, Victor, "Smaller, faster, cheaper, lighter: Introducing DistilBERT, a distilled version of BERT," in Medium, Apr. 28, 2019, 6 pages.

Thompson, et al., "Deep Learning's Diminishing Returns," available at read://https_spectrum.ieee.org/?url=https%3A%2F%2Fspectrum.ieee.org%2Fdeep-learning-computational-cost%23toggle-gdpr, IEEE Spectrum, vol. 58, Issue: 10, Sep. 24, 2021, 7 pages.

Kierszbaum, Samuel, "Masking in Transformers' self-attention mechanism," in https://medium.com/analytics-vidhya/masking-in-transformers-self-attention-mechanism-bad3c9ec235c, Medium, Jan. 27, 2020, 14 pages.

"Attention and Transformer Models," available at https://towardsdatascience.com/attention-and-transformer-models-fe667f958378, Towards Data Science, Nov. 16, 2020, 12 pages.

\* cited by examiner

PROCESS FOR BUILDING A MASK ATTENTION DATA STRUCTURE FOR A PARTICULAR PAIR OF DATA ITEMS IN THE SEQUENCE OF DATA ITEMS THAT IS MADE UP OF A FIRST DATA ITEM AND A SECOND DATA ITEM 1102

MODIFY A HIDDEN STATE ASSOCIATED WITH THE FIRST DATA ITEM BY A MACHINE-TRAINED WEIGHT MATRIX, TO PRODUCE A MODIFIED STATE.
1104

DETERMINE A DISTANCE BETWEEN THE FIRST DATA ITEM AND THE SECOND DATA ITEM WITHIN THE SEQUENCE OF DATA ITEMS.
1106

SELECT A MACHINE-TRAINED DISTANCE-RELATED PARAMETER VALUE FROM A SET OF MACHINE-TRAINED DISTANCE-RELATED PARAMETER VALUES, BASED ON THE DISTANCE THAT IS DETERMINED.
1108

SELECT A MACHINE-TRAINED HEAD-RELATED PARAMETER VALUE FROM A SET OF MACHINE-TRAINED HEAD-RELATED PARAMETER VALUES, BASED ON A PARTICULAR HEAD UNDER CONSIDERATION OF THE MASK ATTENTION NETWORK.
1110

GENERATE A MASK VALUE FOR THE PARTICULAR PAIR OF DATA ITEMS BASED AT LEAST ON THE MODIFIED STATE, THE DISTANCE-RELATED PARAMETER VALUE THAT IS SELECTED IN BLOCK 1108, AND THE HEAD-RELATED PARAMETER VALUE THAT IS SELECTED IN BLOCK 1110.
1112

FIG. 11

TRANSFORMER-BASED NEURAL NETWORK INCLUDING A MASK ATTENTION NETWORK

BACKGROUND

In recent years, both industry and academic environments have expressed significant interest in a type of neural network referred to as a transformer. A traditional transformer includes two types of neural networks operating in series: a self-attention network (SAN) followed by a feed-forward neural network (FNN). The SAN generates an output result that depends on the influence between pairs of data items in an input sequence of data items. The FNN is a fully connected neural network that operates on an output result provided by the SAN. Unlike the SAN, the FNN does not incorporate a self-attention mechanism that takes into account the relations among data items.

The academic literature has proposed numerous refinements to the above-described traditional transformer architecture, e.g., by proposing modified SANs which are designed to replace the traditional SAN in the transformer architecture. These solutions may increase the accuracy of the transformer, but they may do so by increasing its complexity. These improvements may therefore negatively affect the efficiency of the transformer, both with respect to its training and application.

SUMMARY

Described herein is a transformer-based neural network that includes at least one mask attention network (MAN). The MAN is configured to compute an original attention data structure that expresses influence between pairs of data items in a sequence of data items that is fed to the MAN. The MAN then modifies the original data structure by mask values in a mask data structure, to produce a modified attention data structure. Compared to the original attention data structure, the modified attention data structure better accounts for the influence of neighboring data items in the sequence of data items, with respect to a particular data item under consideration. For example, the MAN can boost the relevance of data items within a local neighborhood of data items, with respect to the particular data item under consideration.

According to another illustrative aspect, the transformer-based neural network includes the MAN in combination with at least one attention network that does not use a mask data structure (referred to herein as a "mask-less attention network"), and at least one feed-forward neural network. For instance, the transformer-based neural network can provide a pipeline of data processing mechanisms that includes the MAN followed by a mask-less attention network, followed by a feed-forward neural network.

According to another illustrative aspect, the transformer-based neural network can include a MAN that employs a mask data structure having static mask values.

According to another illustrative aspect, the transformer-based neural network can include a MAN that uses a mask data structure having mask values that are produced based on machine-trained parameter values. The parameter values used by the MAN can also vary depending on the particular level at which the MAN is deployed in the transformer-based neural network, and the particular attention head under consideration (to be described in greater detail below).

According to another illustrative aspect, the mask-less attention network and the feed-forward neural network can themselves be considered as two species of MANs having static mask data structures. That is, the mask-less attention network can be conceptualized as a MAN having a matrix of mask values that are all set to "1." The feed-forward neural network can be conceptualized as a MAN having an identity matrix of mask values (in which the diagonal of the matrix includes mask values set to "1," and the remainder of the mask values set to zero).

According to one technical advantage, the transformer-based neural network provides more accurate results compared to a traditional transformer-based neural network. It accomplishes this objective by more effectively determining the influence between pairs of data items within local neighborhoods of data items. Further, the transformer-based neural network achieves its increased accuracy without markedly increasing the number of machine-trained parameter values used by the transformer-based neural network. This characteristic allows the transformer-based neural network to be trained and applied in a resource-efficient manner.

The above-summarized technique can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 11 shows a process for building a mask data structure for use by the MAN of FIG. 1.

Figure 1:
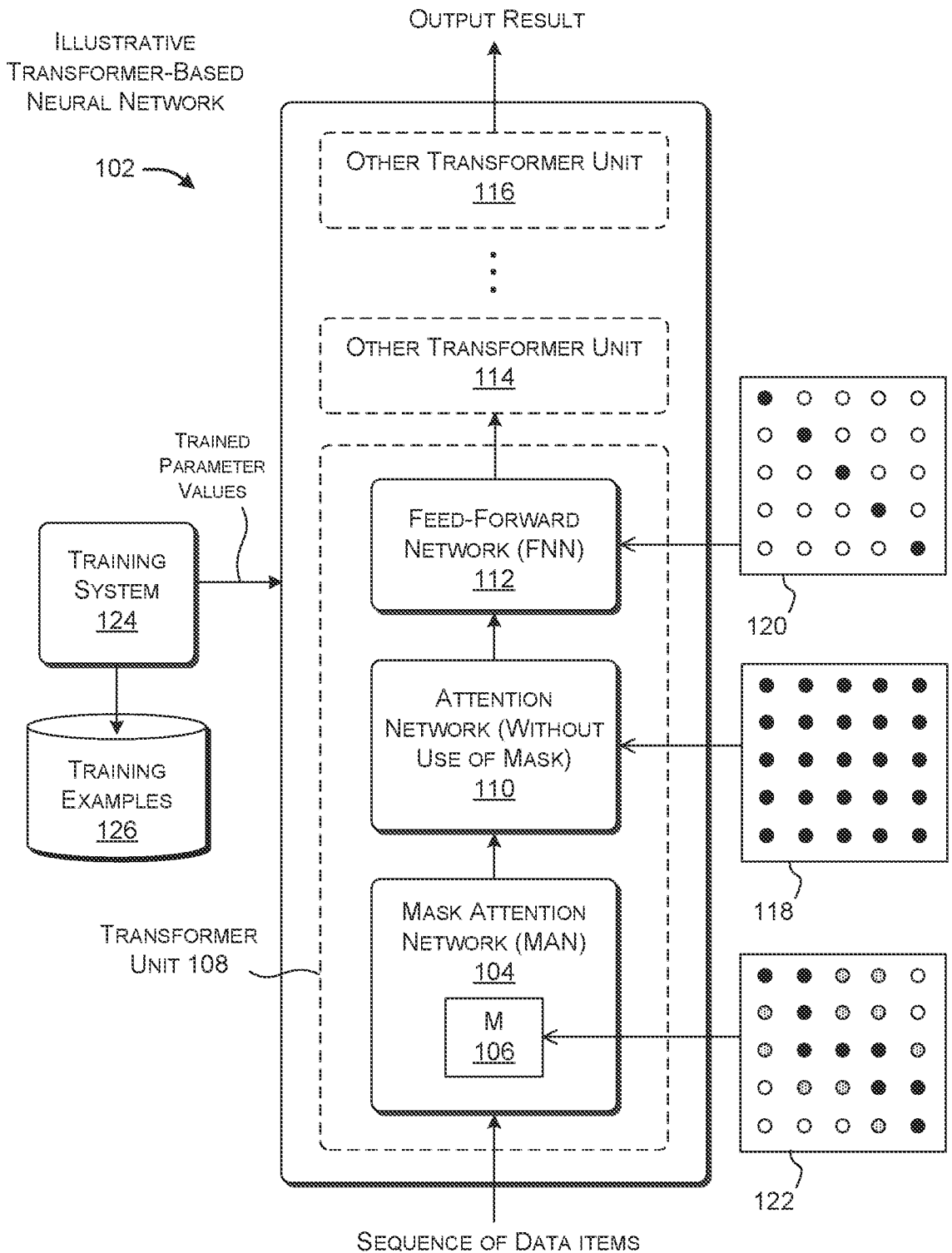
FIG. 1 shows an overview of a transformer-based neural network that includes a mask attention network (MAN).

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes an improved transformer-based neural network. Section B sets forth illustrative methods which explain the operation of the transformer-based neural network of Section A. And Section C describes illustrative computing functionality that can be used to implement any aspect of the features described in Sections A and B.

As a preliminary matter, the term "hardware logic circuitry" corresponds to technology that includes one or more hardware processors (e.g., CPUs, GPUs, etc.) that execute machine-readable instructions stored in a memory, and/or one or more other hardware logic units (e.g., FPGAs) that perform operations using a task-specific collection of fixed and/or programmable logic gates. Section C provides additional information regarding one implementation of the hardware logic circuitry. In some contexts, each of the terms "component," "module," "engine," "system," and "tool" refers to a part of the hardware logic circuitry that performs a particular function or combination of functions.

In one case, the illustrated separation of various parts in the figures into distinct units may reflect the use of corresponding distinct physical and tangible parts in an actual implementation. Alternatively, or in addition, any single part illustrated in the figures may be implemented by plural actual physical parts. Alternatively, or in addition, the depiction of any two or more separate parts in the figures may reflect different functions performed by a single actual physical part.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). In one implementation, the blocks shown in the flowcharts that pertain to processing-related functions can be implemented by the hardware logic circuitry described in Section C, which, in turn, can be implemented by one or more hardware processors and/or other logic units that include a task-specific collection of logic gates.

As to terminology, the phrase "configured to" encompasses various physical and tangible mechanisms for performing an identified operation. The mechanisms can be configured to perform an operation using the hardware logic circuitry of Section C. The term "logic" likewise encompasses various physical and tangible mechanisms for performing a task. For instance, each processing-related operation illustrated in the flowcharts corresponds to a logic component for performing that operation. A logic component can perform its operation using the hardware logic circuitry of Section C. When implemented by computing equipment, a logic component represents an electrical element that is a physical part of the computing system, in whatever manner implemented.

Any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific term "computer-readable storage medium" expressly excludes propagated signals per se in transit, while including all other forms of computer-readable media.

The following explanation may identify one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Further, the term "plurality" refers to two or more items, and does not necessarily imply "all" items of a particular kind, unless otherwise explicitly specified. Further still, the descriptors "first," "second," "third," etc. are used to distinguish among different items, and do not imply an ordering among items, unless otherwise noted. Finally, the terms "exemplary" or "illustrative" refer to one implementation among potentially many implementations.

A. Illustrative Computing Systems

FIG. 1 shows an overview of a transformer-based neural network 102 that includes a mask attention network (MAN) 104. The transformer-based neural network 102 transforms a sequence of data items into an output result. In most of the examples presented herein, the sequence of input data items is a sequence of linguistic tokens, such as a sequence of words or n-grams that make up one or more input sentences. But the transformer-based neural network 102 can be applied to other kinds of input information. For example, the transformer-based neural network 102 can operate on a sequence of audio features extracted from audio content, or a sequence of image features extracted from image or video content, and so on.

The transformer-based neural network 102 produces different kinds of output results, depending on the application context in which it is applied. In one case, an application relies on an encoder (not shown) to map a sequence of input items into a latent semantic vector and/or classification result. That encoder, in turn, incorporates at least one instance of the transformer-based neural network 102 shown in FIG. 1. The latent semantic vector and/or classification result expresses at least one characteristic of the sequence of input items. The application can use the semantic vector or classification result in different ways. To cite one example, a search application provided by a search engine can use the encoder to map a query submitted by a user into a first semantic vector. The search application can use the same encoder to map a candidate linguistic item (such as a document, ad keyword, etc.) to a second latent semantic vector. The search application can then determine the relevance of the query to the candidate linguistic item by computing the distance between the first and second latent semantic vectors, e.g., using cosine similarity or some other distance metric. After repeating this task for plural candidate linguistic items, the search application can notify the user of the most relevant candidate item(s), or perform some other task based on the most relevant candidate item(s).

In another case, an application can rely on both an encoder and a decoder (not shown) to map the sequence of input items from an input form into an output form. Each of the encoder and the decoder, in turn, incorporates at least one instance of the transformer-based neural network 102 shown in FIG. 1. For instance, a machine-translation application can use the encoder to map a sentence in a first natural language (such as English) into an intermediary form, and then use the decoder to map the intermediary form to a sentence in a second natural language (such as French). A document summarization application can use the encoder and decoder to map an original document into a summary document which summarizes the otherwise rephrases the original document, and so on.

In another case, a training system can use an encoder and/or a decoder to produce a pre-trained model. A downstream training system can then use the pre-trained model as a starting point in generating an application-specific model. The encoder and/or the decoder can each incorporate at least one instance of the transformer-based neural network 102 shown in FIG. 1.

The above applications are mentioned here by way of example, not limitation. Other application environments can use the transformer-based neural network 102 for other respective purposes.

From a high-level standpoint, the MAN 104 is configured to generate an original attention data structure that identifies the influence between pairs of data items in the sequence of data items. The MAN then uses a mask data structure 106 to modify the original attention data structure, to produce a modified attention data structure. The modified attention data structure adjusts the original attention data structure to specifically take account for the influence among neighboring data items in the sequence of data items, with respect to a particular data item of interest.

Figure 2:
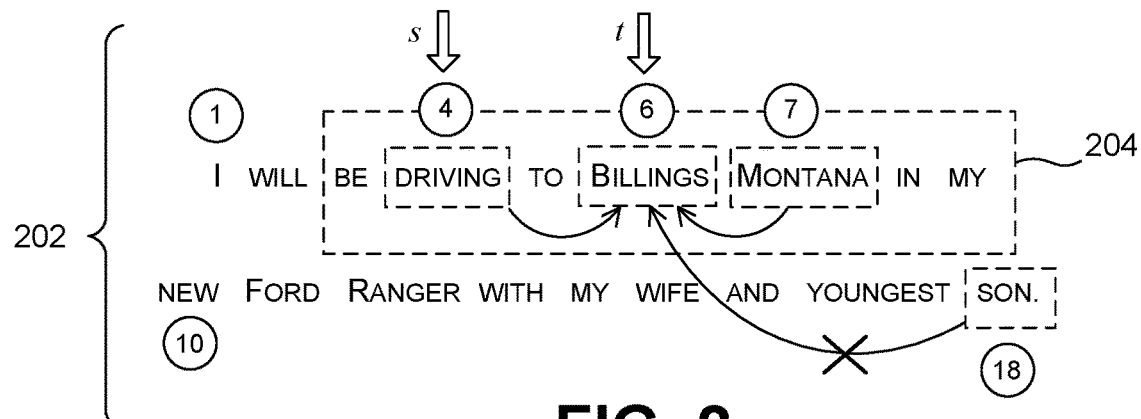
FIG. 2 shows a sequence of data items (here, tokens) that is used to describe the operation of the transformer-based neural network of FIG. 1.

Jumping ahead momentarily in the figures, FIG. 2 provides an example of the above-described concepts. Assume that the sequence of input items expresses an input sentence 202 that reads, "I will be driving to Billings, Montana in my new Ford Ranger with my wife and youngest son." The MAN 104 generates an original attention data structure that describes the influence between different pairs of words in that sentence. For example, consider the word "Billings" as a focus of interest, which is intended to refer to a city in the U.S. State of Montana. The original attention data structure includes a first original attention value that describes how much the word "driving" contributes to understanding the meaning of the word "Billings," a second original attention value that describes how much the word "Montana" contributes to understanding the meaning of the word "Billings," and so on. In this regard, the original attention data structure provides a global expression of the interrelations of words in the input sentence 202. But the original attention data structure may also capture attention information that is not particularly relevant and potentially misleading. For example, the original attention data structure includes an original attention data value that reflects how much the word "son" contributes to understanding the word "Billings." The word "son," however, can be expected to contribute very little to understanding the meaning of "Billings," as it may not be common to use both the words "Billings" and "son" in a single sentence.

The MAN 104 addresses the above issue by using the mask data structure 106 to effectively diminish the importance of some pairings of words in the input sentence 202, and to bolster other pairings of words. For instance, again consider the case in which the word "Billings" is the focal point of interest at the moment. The mask data structure 106 defines a mask value for each pairing in the sentence 202, including a first mask value for the pair of "Billings" and "driving," a second mask value for the pair of "Billings" and "Montana," etc. The MAN 104 can then multiply each such mask value by a corresponding entry in the original attention data structure. For example, the MAN 104 can multiply the mask value for the combination of "Billings' and "driving" by the original attention value for that pairing of words in the original attention data structure, to produce a modified attention value. In many cases, the mask values can be selected in such a manner to boost words in the sentence 202 that are relatively near the word "Billings," and diminish the influence of words that are relatively far from the word "Billings." For example, the mask values can be chosen to enhance the influence of words in a neighborhood 204 of words that is centered on the word "Billings," and diminish the influence of words lying outside the neighborhood 204. In this case, the MAN 104 can apply a mask value to the combination of "Billings" and "son" which will block the contribution of this pairing, or otherwise diminish its importance.

As will be clarified in greater detail below, different implementations can rely on different kinds of mask data structures. In a first case, the mask data structure includes a static set of mask values. For example, again consider the case in which the word "Billings" is the focal point of interest. The mask data structure 206 can assign a mask value having the value "1" to any pairing of words that both appear in the neighborhood 204. The mask data structure 206 can assign the mask value "0" to any paring that includes a word outside the neighborhood 204 (in combination with "Billings" as a first member of the pair). In a second case, the mask data structure 106 contains mask values that are produced based on machine-trained parameter values.

Mathematically expressed, the MAN 104 can produce its output result based on the following illustrative and non-limiting equation:

$$\text{Attention}(Q, K, V) = \frac{M_{i,j}\exp(Q_i K_j^T / \sqrt{d_k})}{\sum_k M_{i,k}\exp(Q_i K_k^T / \sqrt{d_k})} V. \quad (1)$$

The symbols Q, K, and V refer respectively to a query matrix, key matrix, and value matrix that are fed to the MAN 104. For an encoder (for example), the transformer-based neural network 102 produces these input matrices by formulating a matrix X that expresses the sequence of input items as different vectors within the matrix X. It then linearly projects this matrix X into three different matrices (Q,K,V) using three respective machine trained matrices. That is, the transformer-based neural network 102 multiplies the matrix X by a first machine-trained matrix ($W_Q$) to produce the query matrix Q, multiplies the matrix X by a second machine-trained matrix ($W_K$) to produce the key matrix K, and multiplies the matrix X by a third machine-trained matrix ($W_V$) to produce the value matrix V. The symbol $d_k$ refers to the dimensionality of the key matrix K. The symbol M refers to the mask data structure 106. (Note that the matrices Q, K, V, can have other interpretations in other application contexts, compared to the interpretation provided above for an encoder.)

Using the terminology set forth above, the matrix exp ($QK^T/\sqrt{d_k}$) is one example of the original attention data structure, where $QK^T$ refers to the dot product of the matrix Q by the transpose of the matrix K. That is, since the vectors in Q and K originate from individual words in the input sequence of data items, the matrix product $QK^T$ includes original attribute values that express the influence between pairs of data items in the sequence of data items. The pointwise multiplication $M\exp(QK^T/\sqrt{d_k})$ is one example of the modified attention data structure. This pointwise product is produced by multiplying the mask data structure M by the original attention data structure in an element-by-element manner.

Returning to FIG. 1, the transformer-based neural network 102 can optionally include a pipeline of data processing mechanisms that includes the MAN 104 as one member. For instance, the transformer-based neural network 102 can include at least one transformer unit 108 that includes a pipeline of data processing mechanisms that includes the MAN 104, another attention network 110 that does not make use of a mask data structure, and a feed-forward neural network (FNN) 112. Assume that the MAN 104 maps the sequence of input data items into a first output result. The other attention network 110 transforms the first output result into a second output result. And the FNN 112 maps the second output result into a third output result.

The other attention network 110 operates in the same manner as the MAN 104, with the exception that it does not build and apply a mask data structure. For this reason, the other attention network 110 is referred to herein as a "mask-less attention network." This simply means that the other attention network 110 does not apply a mask data structure having the same constitution and purpose as the MAN 104 (and is not meant to exclude the possibility that the other attention network 110 may apply a mask data structure of some other kind in some other context).

More specifically, the mask-less attention network 110 operates using Equation (1), with the exception that the mask data structure M is removed. More succinctly stated, the mask-less attention network 110 operates by applying the equation:

$$\text{Attention}(Q, K, V) = \text{softmax}\left(\frac{QK^T}{\sqrt{d_k}}\right)V. \quad (2)$$

The FNN 112 uses a fully-connected neural network. In one implementation, the FNN 112 transforms hidden state information ($h_i$) for each data item that is fed to it using two successive stages, as defined by the following illustrative and non-limiting equation:

$$\text{FNN}(h_i) = \text{ReLU}(h_i W_1 + b_1) W_2 + b_2 \quad (3).$$

Here, $W_1$ and $W_2$ are matrices of machine-trained parameter values, and $b_1$ and $b_2$ are optional machine-trained bias values. ReLU refers to a rectified linear unit activation function.

The above-described arrangement of the MAN 104, mask-less attention network 110, and the FNN 112 is merely illustrative. In other implementations, a transformation unit can arrange these three processing mechanisms in a different order than described above. In addition, or alternatively, another implementation of a transformation unit can include two or more of any of the above-described types of processing mechanisms, e.g., by including two MANs. In addition, or alternatively, another implementation of a transformation unit can omit one or more of the above-described types of processing mechanisms, e.g., by omitting the mask-less attention network 110. In addition, or alternatively, another implementation of a transformation unit can add one or more other types of processing mechanisms, that is, besides the three types of processing mechanisms described above.

Further note that the transformer-based neural network 102 as a whole can include any number of transformer units stacked together, such as transformer unit 114 and transformer unit 116. Each such transformer unit occurs at a particular level (L) of in the transformer-based neural network 102. Each such transformer unit can include the same three processing mechanisms as the transformer unit 108, or represent a variation thereof. For example, each transformer unit in the transformer-based neural network 102 can include its own MAN as a lead component in its pipeline. However, as will be clarified below, each MAN at each level of the transformer-based neural network 102 can use level-specific parameter values, and can include a level-specific mask data structure.

On another level of abstraction, the MAN 104, mask-less attention network 110, and FNN 112 can be mathematically reformulated as three respective variants of a generically-expressed mask attention network. Each version of the generically-expressed mask attention network includes a different mask data structure M and applies a different activation function $\mathcal{F}$ to the results generated by Equation (1), a point which can be mathematically expressed as $\mathcal{F}$(Attention(Q,K,V)).

For example, the mask-less attention network 110 applies a mask data structure M having mask values that are all set to "1." A mask data structure 118 represents this type of mask information, which includes black-centered dots that represent mask values set to the value "1." The mask-less attention network 110 applies an activation function $\mathcal{F}$ that implements an identity function. With these settings, the generically-expressed mask attention network degenerates into Equation (2). Also note that the absence of a mask data structure enables the mask-less attention network 110 to globally consider the impact of each data item on each other data item in the sequence of data items.

The FNN 112 applies a mask data structure M that adopts the identity matrix. A mask data structure 120 represents this type of mask information, which includes black-centered dots along its diagonal that represent mask values that are set to the value of "1," and white-centered dots that represent mask values that are set to the value of "0." The activation function $\mathcal{F}$ in this case is ReLU. With these settings, the generically-expressed mask attention network degenerates into Equation (3). Note that the FNN 112 refines the sequence of input items that are fed to it, but, unlike the mask-less attention network 110, does not consider the impact of any data item on any other data item.

Finally, in one implementation, the MAN 104 applies a mask data structure that includes machine-trained mask values. A mask data structure 122 represents this type of mask information. The dots having centers with differing degrees of shading represent mask values having differing machine-trained values, ranging from 0 to 1.0. The MAN 104 can be viewed as sharing some characteristics with both the mask-less attention network 110 and the FNN 112. It is like the mask-less attention network 110 in that it considers the impact between at least some pairs of data items in the sequence of data items. It is like the FNN 112 in that it also restricts the interaction among pairs of data items, at least to some extent. In other words, the MAN 104 can be viewed as operationally lying between the MAN 104 and the FNN 112.

A training system 124 produces parameter values used by the transformer-based neural network 102, including the various weighting matrices, bias values, and mask values specified in the above-described equations. The training system 124 performs this task by operating on a data store 126 of training examples. In one merely illustrative case, the training examples can include pairs of sentences. The first member of each pair expresses content in a first natural language, and the second member of the pair expresses the same content in a second natural language. The training system 124 can operate on this training set to minimize or maximize some training objective expressed by a cost function, e.g., by maximizing the production of correct machine translations. The training system 124 can use any training technique to iteratively achieve the above result, such as stochastic gradient descent.

According to one technical advantage, the transformer-based neural network 102 provides more accurate results compared to a traditional transformer-based neural network. It accomplishes this objective by more effectively determining the influence between pairs of data items within local neighborhoods of data items. This can be seen in the example of FIG. 2, where the use of the mask data structure 106 may diminish significance of far-flung parings of words in a sentence, such as "Billings" and "son." Further, the transformer-based neural network 102 achieves its increased accuracy without markedly increasing the number of machine-trained parameter values used by the transformer-based neural network 102. For instance, Equation (1) incorporates the use of a new mask data structure 106, M, compared to Equation (2). The new parameter values required to build M grows with the number of words in an input sequence, the number of levels to be considered in the transformer-based neural network, and the number of heads to be considered in each MAN. This increase in the number of parameters is relatively modest compared to other solutions that require modifications to the manner in which the original attention data structure is computed. This characteristic allows the transformer-based neural network 102 to be trained and applied in a resource-efficient manner compared to other networks that adopt solutions that require an exponential increase in the number of parameter values.

Figure 3:
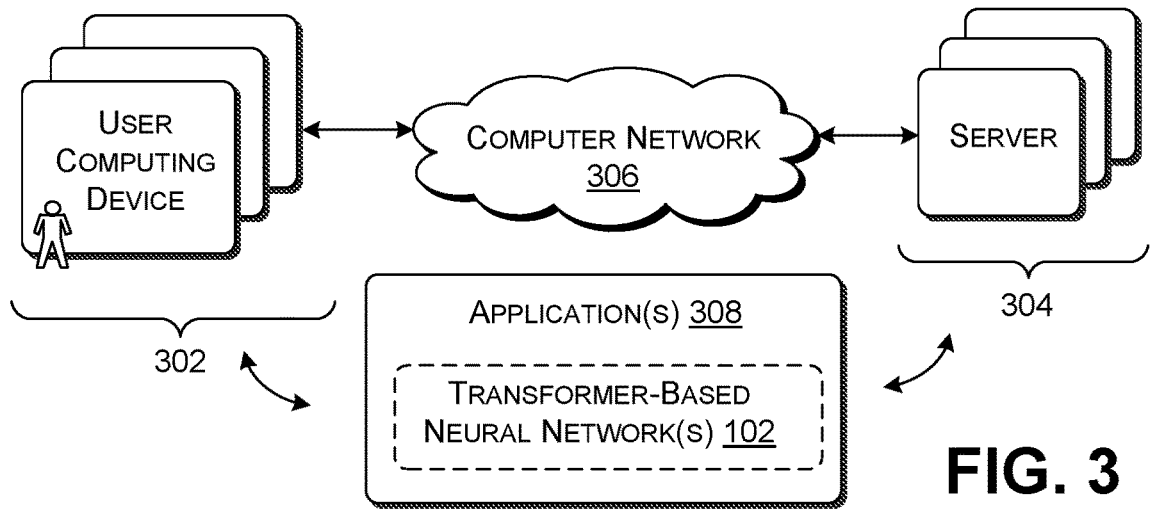
FIG. 3 shows computing equipment that can be used to implement the transformer-based neural network of FIG. 1

FIG. 3 shows computing equipment that can be used to implement any aspects of the transformer-based neural network 102 of FIG. 1. The computing equipment includes a set of user computing devices 302 coupled to a set of servers 304 via a computer network 306. Each user computing device can correspond to any device that performs a computing function, including a desktop computing device, a laptop computing device, a handheld computing device of any type (e.g., a smartphone, a tablet-type computing device, etc.), a mixed reality device, a wearable computing device, an Internet-of-Things (IoT) device, a gaming system, and so on. The computer network 306 can be implemented as a local area network, a wide area network (e.g., the Internet), one or more point-to-point links, or any combination thereof.

FIG. 3 also indicates that one or more applications 308 can be spread across the user computing devices 302 and/or the servers 304 in any manner. Each such application can include at least one transformer-based neural network 102. In one case, an application is entirely implemented by one or more of the servers 304. Here, a user can interact with the application via a user computing device, e.g., using a browser application that runs on the user computing device. In another case, an application is entirely implemented by a user computing device in local fashion, in which case no interaction with the servers 304 is necessary. In another case, the functionality associated with an application is distributed between the servers 304 and each user computing device.

Figure 4:
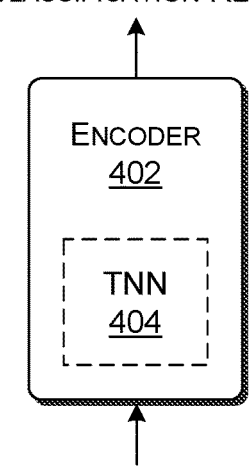
FIG. 4 shows one implementation of the transformer-based neural network of FIG. 1 that includes an encoder.

FIG. 4 shows an encoder 402 that relies on at least one transformer-based neural network (TNN) 404 of the type described in FIG. 1 to map a sequence of input items into a latent semantic vector and/or a classification result.

Figure 5:
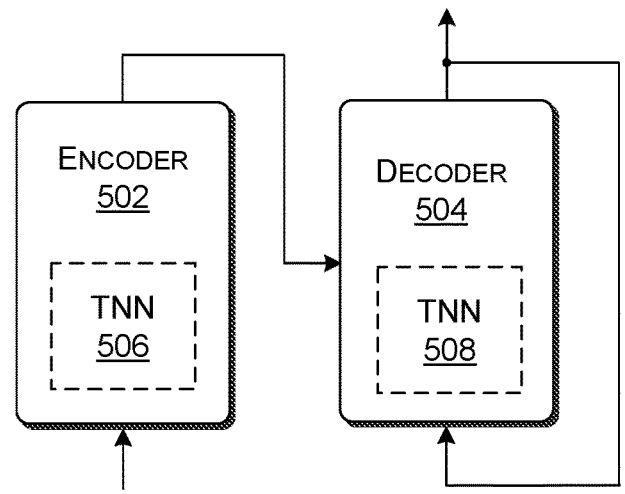
FIG. 5 shows one implementation of the transformer-based neural network of FIG. 1 that includes an encoder and a decoder.

FIG. 5 shows an encoder 502 and a decoder 504 that transform a sequence of input values from one form to another. The encoder 502 includes at least one TNN 506, while the decoder 504 uses at least one TNN 508. In some implementations, the decoder 504 can provide at least one encoder-decoder attention network (not shown) that receives its K and V matrices from an output of the encoder 502, and its Q matrix from an underlying attention network.

Figure 6:
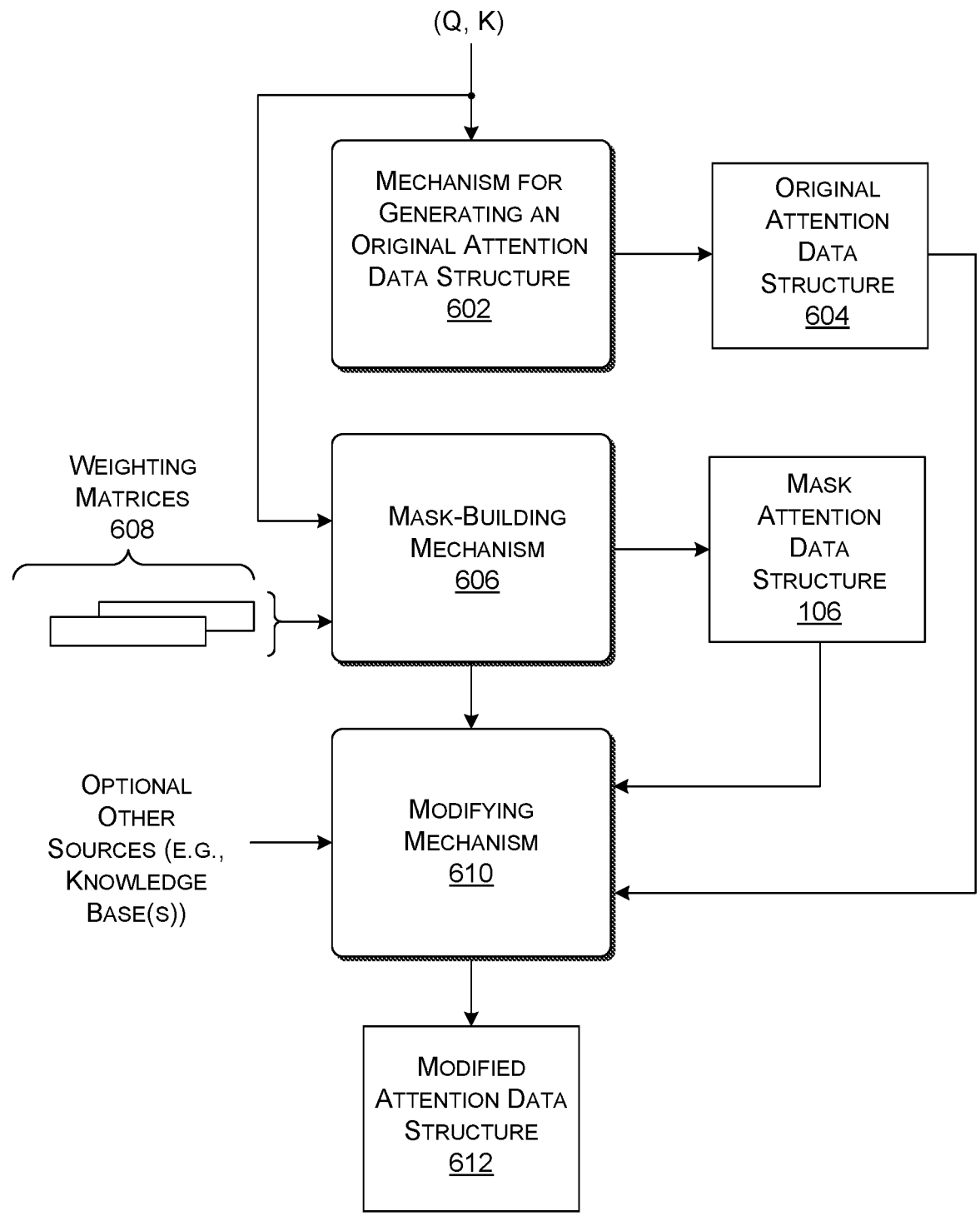
FIG. 6 shows one implementation of part of the MAN of FIG. 1.

FIG. 6 shows one implementation of the MAN 104 of FIG. 1. The MAN 104 includes a mechanism 602 for generating an original attention data structure 604. In the context of Equation (1) above, the mechanism 602 performs this task, in part, by multiplying the Q matrix by the transpose of the K matrix. In the case of an encoder, the vectors in the Q and K matrices represent different encodings of the sequence of input items (e.g., linguistic tokens).

A mask-building mechanism 606 dynamically generates the mask data structure 106. In one implementation, the mask-building mechanism 606 generates each mask value in the mask data structure for a given pair of data items $(w_t, w_s)$, at positions t and s in the sequence, respectively, based on the following equation:

$$M_{t,s,head,level} = \sigma(h_t^{level} W^{level} + P_{t-s}^{level} + U_{head}^{level}) \quad (4)$$

For example, assume that the word $w_t$ in the example of FIG. 2 is "Billings," and the word $w_s$ is "driving." The symbols t and s refer to the positions of these two words in the sentence 202. The symbol level in Equation (4) refers to a particular level in the transformer-based neural network 102 in which the mask data structure M is used. As will be clarified below, the MAN 104 can also apply two or more heads which perform the same calculation described in Equation (1), but with respect to different head-specific machine-trained parameter values; in that context, the symbol head refers to a particular head in the MAN 104. The symbol $h_t^{level}$ refers to a hidden state that represents the word $w_t$ in the sequence of data items at the particular level. For example, $h_t^{level}$ may correspond to an encoding, expressed as a vector, that represents the word "Billings" in FIG. 2. $W^{level}$ represents a machine-trained matrix to be multiplied by $h_t^{level}$. The difference t−s represents a separation between the words $w_t$ and $w_s$ in the sequence of input items. For instance, if $w_t$ and $w_s$ are separated by three words, then t−s will be 3. The symbol $P_{t-s}^{level}$ refers to a machine-trained parameter value associated with the difference t−s and the particular level. And $U_{head}^{level}$ refers to a machine-trained parameter value associated with the particular head and the particular level under consideration. σ refers to an activation function applied to the sum shown in Equation (4), in this case, the sigmoid function.

FIG. 6 shows that the mask-building mechanism 606 draws machine-trained parameters values from one or more weight matrices 608. For example, a first weighting matrix (or a set of plural matrices) can store a set of machine-trained values for $P_{t-s}^{level}$, for different values of level, and for different values of t−s, such as {−3, −2, −1, 0, +1, +2, +3}. Similarly, a second weight matrix (or a set of plural matrices) can store a set of machine-trained values for $U_{head}^{level}$ for different values of level, and for different values of head. The mask-building mechanism 606 selects values from these matrices depending on the particular values of level, t–s, and head under consideration. The mask-building mechanism 606 can also optionally draw from a weight matrix (or a set of plural matrices) that includes precomputed values of $h_t^{level}W^{level}$. This is possible for the case in which there is a predetermined vocabulary of words $w_t$ (and associated hidden states $h_t^{level}$), and a predetermined set of matrices for $W^{level}$. Note that the mask value given by Equation (2) depends on the position t of $w_t$ relative to the positions of $w_s$, and the hidden state of $w_t$ (which is $h_t$), but does not depend on the hidden state of $w_s$. This means that the same mask value can be used for a word $w_s$ that occurs n words before $w_t$, regardless of what that word may be.

Note that the mask-building mechanism 606 can update the map data structure 106 based on the receipt of a new sequence of input items having new data items (e.g., new tokens). This is because the first term of Equation (4) depends on the encoding $h_t$. And for this reason, the MAN 104 may be considered dynamic in nature. As also explained above, the MAN 104 provides different map data structures for different levels and attention heads.

A modifying mechanism 610 next produces a modified attention data structure 612 based on the mask data structure 106. It does this by pointwise (element-by-element) multiplying the original attention data structure 604 by the mask data structure 106, e.g., as expressed by the numerator of Equation (1). Although not represented in FIG. 6, the MAN 104 also multiplies the modified attention data structure 612 by the value matrix V, as specified by Equation (1).

In another implementation, the mask-building mechanism 606 produces a mask data structure that includes static mask values, without relying on any machine-trained parameter values. For example, the mask-building mechanism 606 can set an original attention value to zero if a pair of data items (t,s) under consideration are separated by more than a prescribed number of data items (such as five data items in one merely illustrative case). It can otherwise set an original attention value to "1." In another implementation, the mask-building mechanism 606 produces a mask data structure that includes a combination of static mask values and mask values produced based on machine-trained parameter values.

Finally, FIG. 6 shows another arrow pointing to the modifying mechanism 610 that is given the label "other sources." This label indicates that the modifying mechanism 610 can receive additional information from external sources, and leverage those sources to further modify the original attention data structure and/or to supplement the processing performed by the transformer-based neural network 102 in other ways. The "other sources" can include one or more knowledgebases that provide knowledge regarding the relationship among terms. For example, assume that a particular input sequence includes two words that are related, but the input sequence itself does not reveal that relationship. The modifying mechanism 610 can gain this insight by consulting a knowledgebase. The modifying mechanism 610 can then enhance or diminish an original attention value based on its determination of whether or not the two words are related. For example, assume that a sentence included the words "Billings" and "Yellowjacket." A knowledgebase may indicate that Yellowjacket is the name of the mascot of a local university in Billings, MT, and that these two words therefore have a semantic relation.

Figure 7:
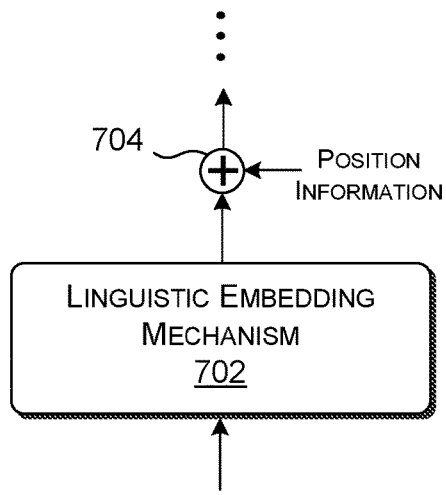
FIGS. 7-9 show additional functionality that may be incorporated into the transformer-based neural network of FIG. 1.
Figure 8:
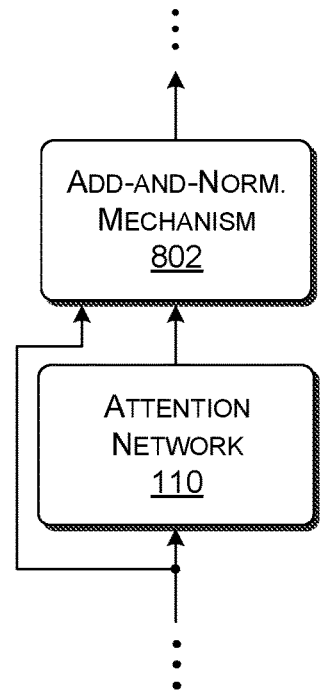
Figure 9:
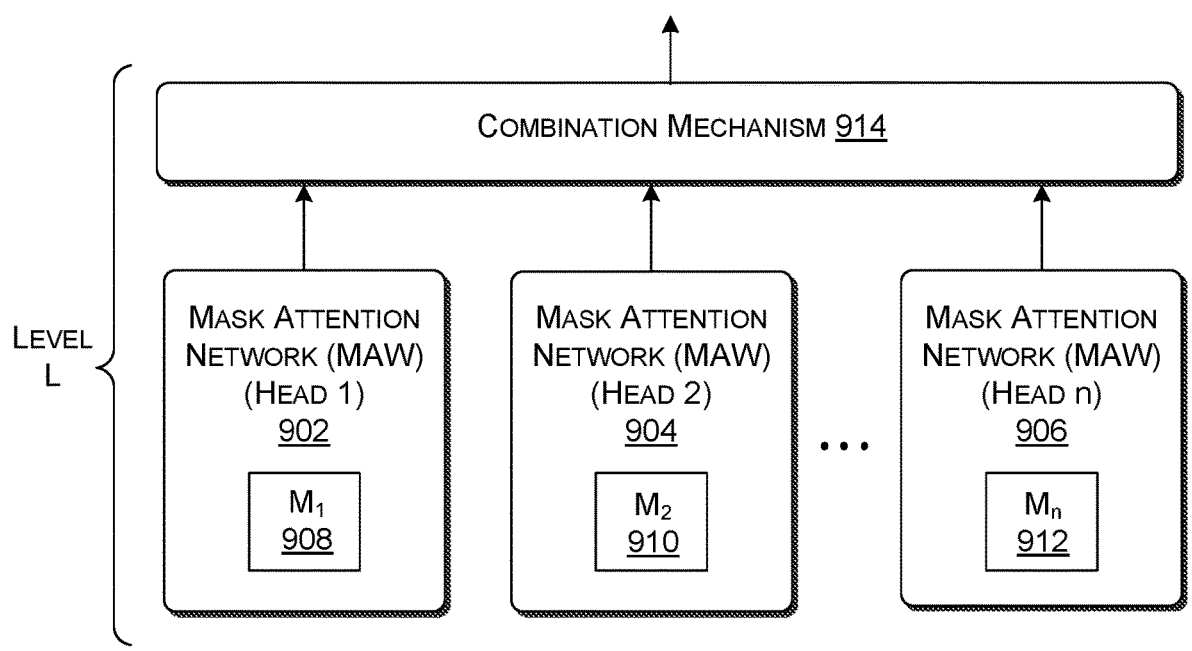

FIGS. 7-9 show additional functionality that may be incorporated in the transformer-based neural network 102 of FIG. 1. Starting with FIG. 7, this figure shows preliminary processing that can be applied to a sequence of data items prior to feeding those data items into the MAN 104. First, an embedding mechanism 702 transforms the data items (e.g., linguistic tokens) into a set of input embeddings, also referred to herein as input vectors. The embedding mechanism 702 can use different techniques to perform this task. In one approach, the embedding mechanism 702 can convert each input item in an input sequence into a vector representation using a lookup table, neural network, etc.

Next, an adding mechanism 704 adds position information to each input embedding. The position information describes the position of a data item (associated with a particular input embedding) in the sequence of data items. For example, assume that an input sequence includes words in a phrase that reads "hybrid Ford hatchback 2020." The adding mechanism 704 will add position information to the input embedding associated with "hybrid" that indicates that the word "hybrid" is the first word in the phrase. Overall, the transformer-based neural network 102 adds position information to the input embeddings to inform its attention networks of the positional context of each data item under consideration within the sequence of data items. The adding mechanism 704 can encode position information in different ways, such as by using one or more sinusoidal functions to map an index of a data item into position information, or by using a machine-trained function to map the index of the data item into position information, etc. Overall, the adding mechanism 704 produces position-modified embeddings for application to the MAN 104 of FIG. 1.

FIG. 8 shows an add-and-normalize mechanism 802 that can be placed between the mask-less attention network 110 and the FNN 112. Although not shown, another add-and-normalize mechanism may be provided after the FNN 112. The particular add-and-normalize mechanism 802 shown in FIG. 8 adds the input that is fed to the mask-less attention network 110 to its output, to produce a sum, and then performs layer normalization on that sum. That is, if the sum is expressed as a vector v, layer normalization involves subtracting the mean y of the elements in the vector v from the vector v, and dividing that result by the standard deviation σ of the elements in the vector v.

FIG. 9 shows that the MAN 104 of FIG. 1 can include at least three heads (902, 904, 906) that perform the same calculation shown in Equation (1), but using different machine-trained parameter values. The different heads effectively capture different insights from the sequence of input items using different representation subspaces. FIG. 1 also shows that the heads (902, 904, 906) apply different respective mask data structures (908, 910, 912). A combination mechanism 914 concatenates the output results produced by the different heads (902, 904, 906), and then multiples this concatenation result by another machine-trained matrix $W_O$. The mask-less attention network 110 also uses multiple heads, but without masks.

B. Illustrative Processes

Figure 10:
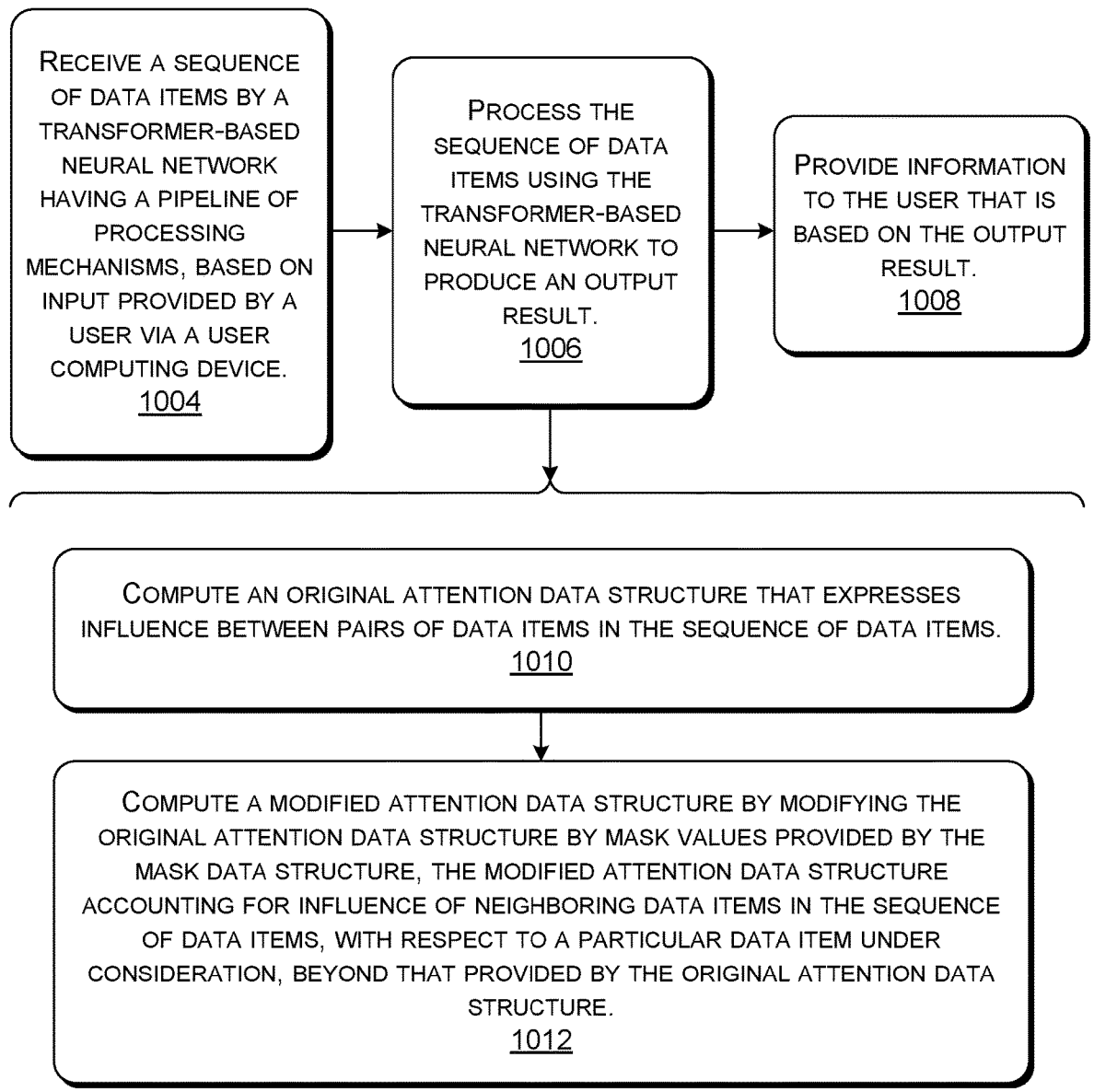
FIG. 10 shows a process that provides an overview of one manner of operation of the transformer-based neural network of FIG. 1.
Figure 12:
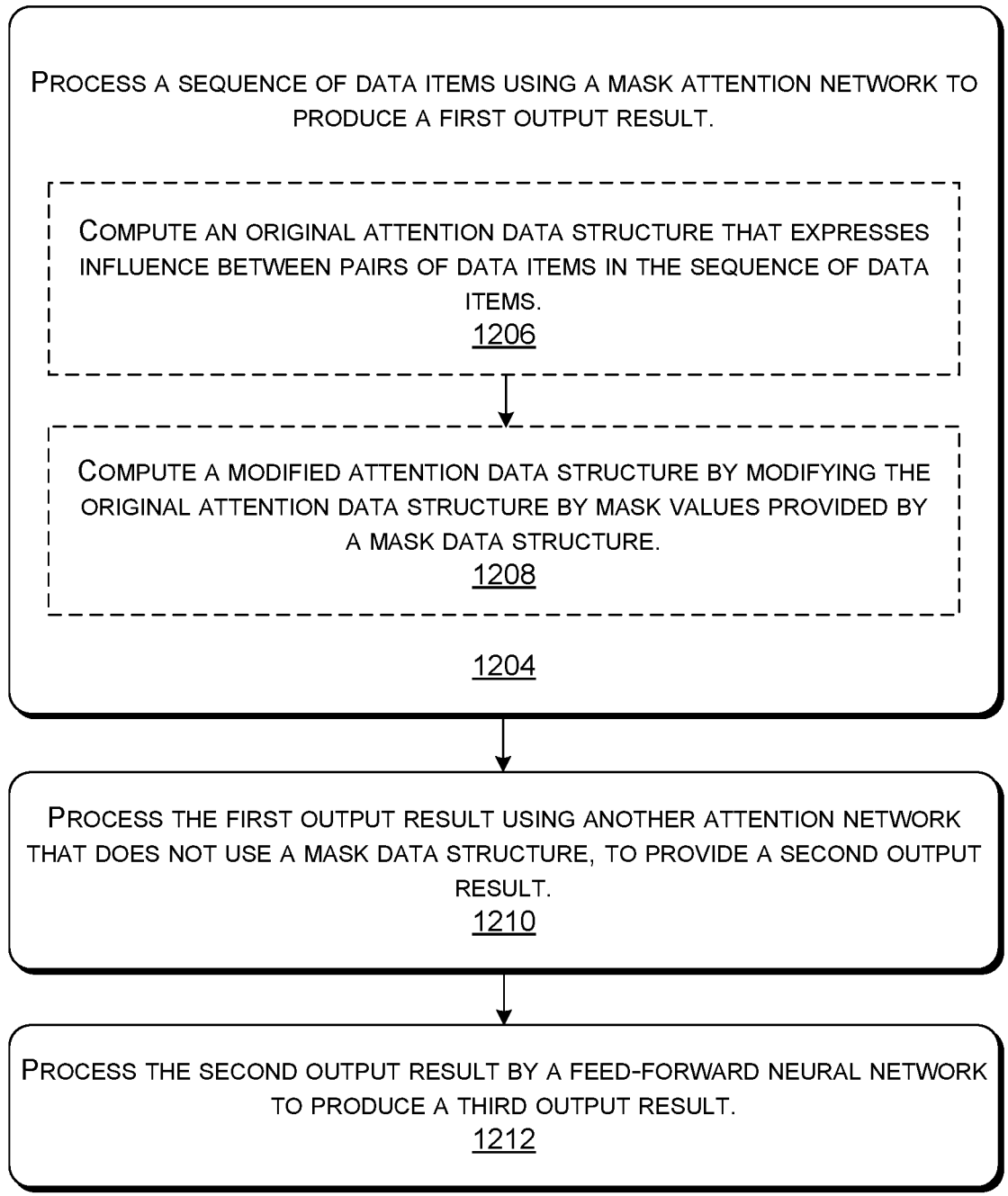
FIG. 12 shows a process that represents the operation of a particular type of transformer-based neural network that includes a particular pipeline of processing mechanisms.

FIGS. 10-12 show processes that explain the operation of the transformer-based neural network 102 of Section A in flowchart form. Since the principles underlying the operation of the transformer-based neural network 102 have already been described in Section A, certain operations will be addressed in summary fashion in this section. As noted in the prefatory part of the Detailed Description, each flowchart is expressed as a series of operations performed in a particular order. But the order of these operations is merely representative, and can be varied in any manner.

To begin with, FIG. 10 shows a process 1002 that provides an overview of the operation of a transformer-based neural network 102 of FIG. 1, according to one implementation. In block 1004, an application receives a sequence of data items, based on input provided by a user computing device. The application uses the transformer-based neural network 102, which, in turn, provides a pipeline of processing mechanisms. In block 1006, the transformer-based neural network 102 processes the sequence of data items to produce an output result. In block 1008, the application provides information to the user that is based on the output result.

At least one processing mechanism in the pipeline of processing mechanisms provided by the transformer-based neural network 102 includes a mask attention network (MAN) 104. The MAN 104 includes a mask data structure 106. FIG. 10 also summarizes operations performed by the MAN 104. More specifically, in block 1010, the MAN 104 computes an original attention data structure 604 that expresses influence between pairs of data items in the sequence of data items. In block 1012, the MAN 104 computes a modified attention data structure 612 by modifying the original attention data structure 604 by mask values provided by the mask data structure 106. The modified attention data structure 612 accounts for influence of neighboring data items in the sequence of data items, with respect to a particular data item under consideration, beyond that provided by the original attention data structure 604.

FIG. 11 shows a process 1102 for building the mask data structure 106. The process 1102 is specifically framed in the context of a particular pair of data items in the sequence of data items that is made up of a first data item ($w_t$) at a position t and a second data item ($w_s$) at a position s. In block 1104, the MAN 104 modifies a hidden state $h_t$ associated with the first data item by a machine-trained weight matrix, to produce a modified state. In block 1106, the MAN 104 determines a distance (t–s) between the first data item $w_t$ and the second data item $w_s$ within the sequence of data items. In block 1108, the MAN 104 selects a machine-trained distance-related parameter value ($P_{t-s}$) from a set of machine-trained distance-related parameter values, based on the distance that is determined in block 1106. In block 1110, the MAN 104 selects a machine-trained head-related parameter value (U) from a set of machine-trained head-related parameter values, based on a particular head of the MAN 104 under consideration. Although not shown, blocks 1108 and 1110 can also make their selections based on the level at which the MAN 104 exists in the transformer-based neural network 102. In block 1112, the MAN 104 generates a mask value for the particular pair of data items based at least on the modified state, the distance-related parameter value that is selected in block 1108, and the head-related parameter value that is selected in block 1110.

FIG. 12 shows a process 1202 that represents an overview of the operation of the transformer-based neural network, for the particular configuration of the transformer-based neural network 102 shown in FIG. 1. In block 1204, the transformer-based neural network 102 processes a sequence of data items using a mask attention network (MAN) 104 to produce a first output result. More specifically, in block 1206, the MAN 104 computes an original attention data structure 604 that expresses influence between pairs of data items in the sequence of data items. In block 1208, the MAN 104 computes a modified attention data structure 612 by modifying the original attention data structure 604 by mask values provided by a mask data structure 106. In block 1210, the transformer-based neural network 102 processes the first output result using another attention network 110 that does not use a mask data structure, to provide a second output result. In block 1212, the transformer-based neural network 102 processes the second output result by a feed-forward neural network (FNN) 112, to produce a third output result.

C. Representative Computing Functionality

Figure 13:
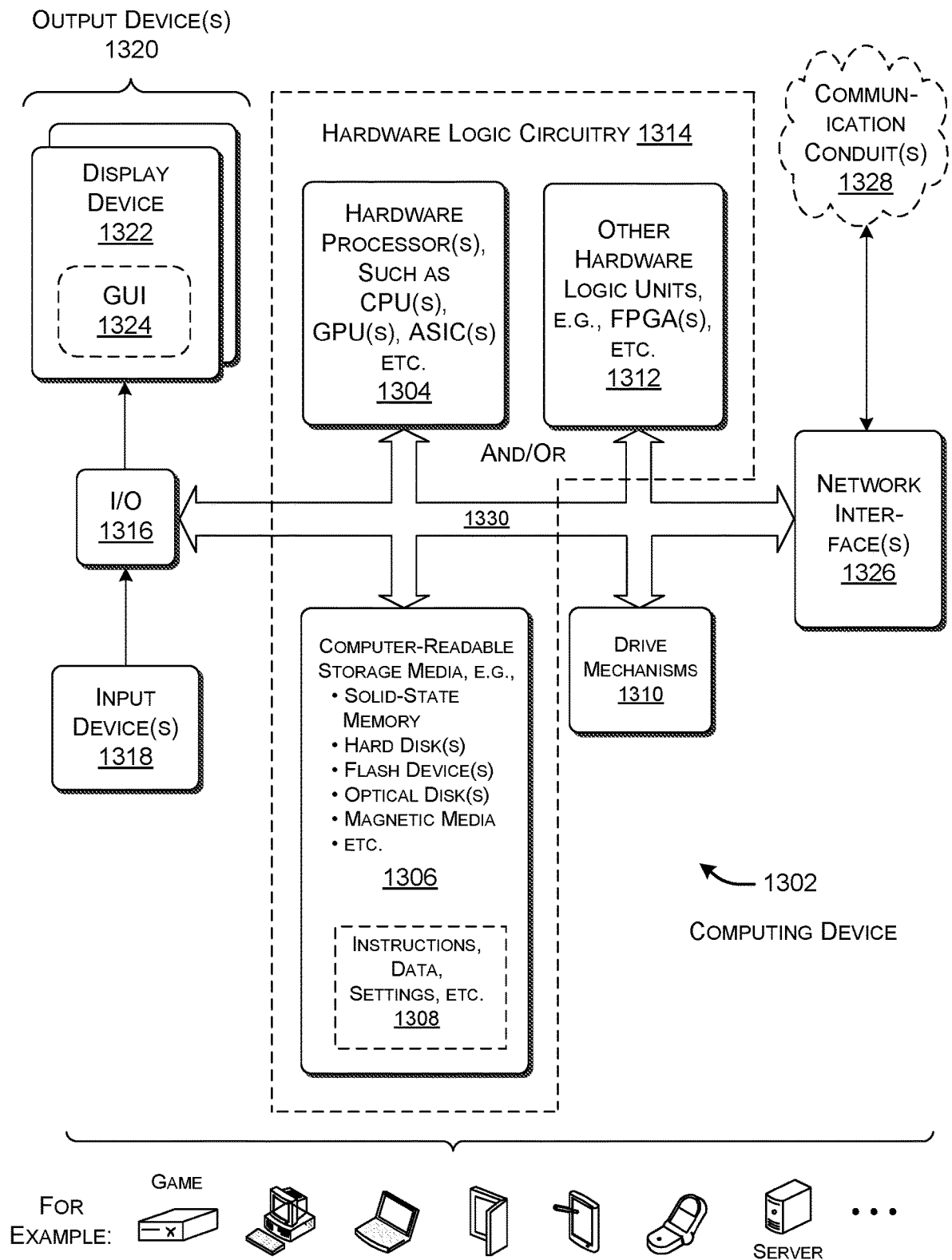
FIG. 13 shows an illustrative type of computing device that can be used to implement any aspect of the features shown in the foregoing drawings.

FIG. 13 shows a computing device 1302 that can be used to implement any aspect of the mechanisms set forth in the above-described figures. For instance, with reference to FIG. 3, the type of computing device 1302 shown in FIG. 13 can be used to implement any user computing device or any server. In all cases, the computing device 1302 represents a physical and tangible processing mechanism.

The computing device 1302 can include one or more hardware processors 1304. The hardware processor(s) 1304 can include, without limitation, one or more Central Processing Units (CPUs), and/or one or more Graphics Processing Units (GPUs), and/or one or more Application Specific Integrated Circuits (ASICs), etc. More generally, any hardware processor can correspond to a general-purpose processing unit or an application-specific processor unit.

The computing device 1302 can also include computer-readable storage media 1306, corresponding to one or more computer-readable media hardware units. The computer-readable storage media 1306 retains any kind of information 1308, such as machine-readable instructions, settings, data, etc. Without limitation, for instance, the computer-readable storage media 1306 may include one or more solid-state devices, one or more magnetic hard disks, one or more optical disks, magnetic tape, and so on. Any instance of the computer-readable storage media 1306 can use any technology for storing and retrieving information. Further, any instance of the computer-readable storage media 1306 may represent a fixed or removable unit of the computing device 1302. Further, any instance of the computer-readable storage media 1306 may provide volatile or non-volatile retention of information.

The computing device 1302 can utilize any instance of the computer-readable storage media 1306 in different ways. For example, any instance of the computer-readable storage media 1306 may represent a hardware memory unit (such as Random Access Memory (RAM)) for storing transient information during execution of a program by the computing device 1302, and/or a hardware storage unit (such as a hard disk) for retaining/archiving information on a more permanent basis. In the latter case, the computing device 1302 also includes one or more drive mechanisms 1310 (such as a hard drive mechanism) for storing and retrieving information from an instance of the computer-readable storage media 1306.

The computing device 1302 may perform any of the functions described above when the hardware processor(s) 1304 carry out computer-readable instructions stored in any instance of the computer-readable storage media 1306. For instance, the computing device 1302 may carry out computer-readable instructions to perform each block of the processes described in Section B.

Alternatively, or in addition, the computing device 1302 may rely on one or more other hardware logic units 1312 to perform operations using a task-specific collection of logic gates. For instance, the hardware logic unit(s) 1312 may include a fixed configuration of hardware logic gates, e.g., that are created and set at the time of manufacture, and thereafter unalterable. Alternatively, or in addition, the other hardware logic unit(s) 1312 may include a collection of programmable hardware logic gates that can be set to perform different application-specific tasks. The latter category of devices includes, but is not limited to Programmable Array Logic Devices (PALs), Generic Array Logic Devices (GALs), Complex Programmable Logic Devices (CPLDs), Field-Programmable Gate Arrays (FPGAs), etc.

FIG. 13 generally indicates that hardware logic circuitry 1314 includes any combination of the hardware processor(s) 1304, the computer-readable storage media 1306, and/or the other hardware logic unit(s) 1312. That is, the computing device 1302 can employ any combination of the hardware processor(s) 1304 that execute machine-readable instructions provided in the computer-readable storage media 1306, and/or one or more other hardware logic unit(s) 1312 that perform operations using a fixed and/or programmable collection of hardware logic gates. More generally stated, the hardware logic circuitry 1314 corresponds to one or more hardware logic units of any type(s) that perform operations based on logic stored in and/or otherwise embodied in the hardware logic unit(s).

In some cases (e.g., in the case in which the computing device 1302 represents a user computing device), the computing device 1302 also includes an input/output interface 1316 for receiving various inputs (via input devices 1318), and for providing various outputs (via output devices 1320). Illustrative input devices include a keyboard device, a mouse input device, a touchscreen input device, a digitizing pad, one or more static image cameras, one or more video cameras, one or more depth camera systems, one or more microphones, a voice recognition mechanism, any movement detection mechanisms (e.g., accelerometers, gyroscopes, etc.), and so on. One particular output mechanism may include a display device 1322 and an associated graphical user interface presentation (GUI) 1324. The display device 1322 may correspond to a liquid crystal display device, a light-emitting diode display (LED) device, a cathode ray tube device, a projection mechanism, etc. Other output devices include a printer, one or more speakers, a haptic output mechanism, an archival mechanism (for storing output information), and so on. The computing device 1302 can also include one or more network interfaces 1326 for exchanging data with other devices via one or more communication conduits 1328. One or more communication buses 1330 communicatively couple the above-described units together.

The communication conduit(s) 1328 can be implemented in any manner, e.g., by a local area computer network, a wide area computer network (e.g., the Internet), point-to-point connections, etc., or any combination thereof. The communication conduit(s) 1328 can include any combination of hardwired links, wireless links, routers, gateway functionality, name servers, etc., governed by any protocol or combination of protocols.

FIG. 13 shows the computing device 1302 as being composed of a discrete collection of separate units. In some cases, the collection of units may correspond to discrete hardware units provided in a computing device chassis having any form factor. FIG. 13 shows illustrative form factors in its bottom portion. In other cases, the computing device 1302 can include a hardware logic unit that integrates the functions of two or more of the units shown in FIG. 1. For instance, the computing device 1302 can include a system on a chip (SoC or SOC), corresponding to an integrated circuit that combines the functions of two or more of the units shown in FIG. 13.

The following summary provides a non-exhaustive set of illustrative examples of the technology set forth herein.

According to a first example, one or more computing devices for processing a sequence of data items is described. The computing device(s) include a transformer-based neural network, which, in turn, includes neurons implemented by hardware logic circuitry. The transformer-based neural network has a pipeline of processing mechanisms. At least one processing mechanism in the pipeline of processing mechanisms includes a mask attention network. The mask attention network includes a mask data structure. The mask attention network is configured to perform operations of: computing an original attention data structure that expresses influence between pairs of data items in the sequence of data items; and computing a modified attention data structure by modifying the original attention data structure by mask values provided by the mask data structure. The modified attention data structure accounts for influence of neighboring data items in the sequence of data items, with respect to a particular data item under consideration, beyond that provided by the original attention data structure. The transformer-based neural network is configured to generate an output result based at least in part on the modified attention data structure. The computing device(s) also includes an application implemented by the hardware logic circuitry that uses the transformer-based neural network to provide a service to at least one user.

According to a second example, the pipeline of processing mechanisms includes, in addition to the mask attention network, another attention network that does not use the mask data structure, and a feed-forward neural network.

According to a third example, relating to the second example, the masked attention network occurs prior to the other attention network in the pipeline of processing mechanisms, and wherein the other attention network occurs prior to the feed-forward neural network in the pipeline of processing mechanisms.

According to a fourth example, the transformer-based neural network includes an encoder, and wherein the mask attention network is a part of the encoder.

According to a fifth example, the transformer-based neural network includes both an encoder and a decoder, the encoder feeding an encoder output result as input into the decoder. The encoder includes at least one mask attention network and the decoder includes at least one mask attention network.

According to a sixth example, the mask data structure includes a set of binary-valued static parameter values.

According to a seventh example, the mask data structure is built based on parameter values produced by a machine training system.

According to an eighth example, the mask attention network is configured to build the mask data structure. The building the mask attention data structure includes, for a particular pair of data items in the sequence of data items that is made up of a first data item and a second data item: modifying a hidden state associated with the first data item by a machine-trained weight matrix, to produce a modified state; determining a distance between the first data item and the second data item within the sequence of data items; selecting a machine-trained distance-related parameter value from a set of machine-trained distance-related parameter values, based on the distance that is determined; and generating a mask value for the particular pair of data items based at least on the modified state and the distance-related parameter value that is selected.

According to a ninth example, relating to the eighth example, the operation of generating a mask value includes summing at least the modified state and the distance-related parameter value that is selected to produce a sum, and then modifying the sum by an activation function.

According to a tenth example, relating to the eighth example, the mask attention network corresponds to a particular head of a multi-headed network. The mask attention network is further configured to select a machine-trained head-related parameter value from a set of machine-trained head-related parameter values, based on the particular head. Further, the operation of generating the mask value for the particular pair is also based on the head-related parameter value that is selected.

According to an eleventh example, relating to the eighth example, the mask attention network exists within a particular level of the transformer-based neural network. The distance-related parameter value that is selected is also selected based on the particular level.

According to a twelfth example, the transformer-based neural network includes an encoder and a decoder that cooperatively transform the sequence of data items from a first form to a second form. The output result includes the data items in the second form.

According to a thirteenth example, the transformer-based neural network includes an encoder that transforms the sequence of data items into a semantic vector and/or a classification result. The output result includes the semantic vector and/or the classification result.

According to a fourteenth example, a computer-implemented method for processing a sequence of data items is described. The method includes: receiving, by an application, the sequence of data items based on input provided by a user via a user computing device, the application providing a transformer-based neural network having a pipeline of processing mechanisms; processing the sequence of data items using the transformer-based neural network to produce an output result; and providing information to the user, by the application, that is based on the output result. At least one processing mechanism in the pipeline of processing mechanisms includes a mask attention network. The mask attention network includes a mask data structure. The mask attention network performs operations of: computing an original attention data structure that expresses influence between pairs of data items in the sequence of data items; and computing a modified attention data structure by modifying the original attention data structure by mask values provided by the mask data structure. The modified attention data structure accounts for influence of neighboring data items in the sequence of data items, with respect to a particular data item under consideration, beyond that provided by the original attention data structure.

According to a fifteenth example, relating to the fourteenth example, the pipeline of processing mechanisms includes, in addition to the mask attention network, another attention network that does not use the mask data structure, and a feed-forward neural network.

According to a sixteenth example, relating to the fifteenth example, the masked attention network occurs prior to the other attention network in the pipeline of processing mechanisms, and wherein the other attention network occurs prior to the feed-forward neural network in the pipeline of processing mechanisms.

According to a seventeenth example, relating to the fourteenth example, the method further includes building the mask data structure. The operation of building of the mask data structure includes, for a particular pair of data items in the sequence of data items that is made up of a first data item and a second data item: modifying a hidden state associated with the first data item by a machine-trained weight matrix, to produce a modified state; determining a distance between the first data item and the second data item within the sequence of data items; selecting a machine-trained distance-related parameter value from a set of machine-trained distance-related parameter values, based on the distance that is determined and based on a particular level in which the mask attention network exists in the transformer-based neural network; and generating a mask value for the particular pair of data items based at least on the modified state and the distance-related parameter value that is selected.

According to an eighteenth aspect, relating to the seventeenth aspect, the mask attention network corresponds to a particular head of a multi-headed network. The mask attention network is further configured to select a machine-trained head-related parameter value from a set of machine-trained head-related parameter values, based on the particular head and based on the particular level. Further, the operation of generating the mask value for the particular pair is also based on the head-related parameter value that is selected.

According to a nineteenth aspect, a computer-readable storage medium for storing computer-readable instructions is described. The computer-readable instructions, when executed by one or more hardware processors, perform a method that includes processing a sequence of data items using a mask attention network to produce a first output result. More specifically, the mask attention network performs operations of: computing an original attention data structure that expresses influence between pairs of data items in the sequence of data items; and computing a modified attention data structure by modifying the original attention data structure by mask values provided by a mask data structure. The method also includes: processing the first output result using another attention network that does not use a mask data structure, to provide a second output result; and processing the second output result by a feed-forward neural network to produce a third output result. The mask attention network, the other attention network, and the feed-forward neural network are also implemented by the computer-readable instructions provided by the computer-readable storage medium.

According to a twentieth aspect, relating to the nineteenth aspect, the method further includes building the mask data structure, wherein the operation of building of the mask data structure includes, for a particular pair of data items in the sequence of data items that is made up of a first data item and a second data item: modifying a hidden state associated with the first data item by a machine-trained weight matrix, to produce a modified state; determining a distance between the first data item and the second data item within the sequence of data items; selecting a machine-trained distance-related parameter value from a set of machine-trained distance-related parameter values, based on the distance that is determined; and generating a mask value for the particular pair of data items based at least on the modified state and the distance-related parameter value that is selected.

A twenty-first aspect corresponds to any combination (e.g., any logically consistent permutation or subset) of the above-referenced first through twentieth examples.

A twenty-second aspect corresponds to any method counterpart, device counterpart, system counterpart, means-plus-function counterpart, computer-readable storage medium counterpart, data structure counterpart, article of manufacture counterpart, graphical user interface presentation counterpart, etc. associated with the first through twenty-first examples.

In closing, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-readable storage medium for storing computer-readable instructions, the computer-readable instructions, when executed by one or more hardware processors, performing a method by a particular transformer at a particular level in a stack of transformers of a transformer-based neural network, the method comprising:

receiving a sequence of data items provided by an application;

in a first neural network in a pipeline of neural networks of the particular transformer, processing the sequence of data items using a mask attention network to produce a first output result, the mask attention network performing operations of:
generating an original attention data structure that expresses influence between pairs of data items in the sequence of data items;
dynamically generating a mask data structure that is a mask that contains mask values, a particular mask value of the mask values being produced by determining a separation between a particular pair of data items in the sequence of data items at the particular level, selecting and retrieving a distance-related machine-trained value based on the separation between the particular pair of data items that has been determined, and determining the particular mask value based, in part, on the machine-trained value,
the machine-trained value that is selected and retrieved being independent of meanings of the particular pair of data items,
the distance-related machine-trained value being selected and retrieved from a stored set of distance-related machine-trained values associated with different respective separations between pairs of data items and for different levels,
a training system having previously produced the stored set of distance-related machine-trained values for the different respective separations by iteratively operating on a set of training examples to achieve a training objective;
producing a modified attention data structure by modifying the original attention data structure by the mask values provided by the mask data structure;

processing the first output result using another attention network that does not use a mask data structure and the stored set of distance-related machine-trained values associated with different separations, to provide a second output result, said another attention network being a second neural network that follows the first neural network in the pipeline; and processing the second output result by a feed-forward neural network to produce a third output result, the feed-forward neural network being a third neural network that follows the second neural network in the pipeline, the mask attention network, said another attention network, and the feed-forward neural network also being implemented by the computer-readable instructions provided by the computer-readable storage medium, the method having a resource-efficiency that depends on a number of machine-trained values that are used to generate the mask data structure.

2. The computer-readable storage medium of claim 1, wherein the mask data structure is used in a particular head of the transformer-based neural network at the particular level, and wherein the particular mask value for the particular pair of data items at the particular level is formed by summing an encoding of one data item of the particular pair of data items multiplied by a machine-trained weight matrix, the distance-related machine-trained value associated with a separation between the particular pair of data items, and a machine-trained value associated with the particular head.

3. The computer-readable storage medium of claim 1, wherein the number of machine-trained values used to generate the mask data structure depends on a number of words in the sequence of data items, a number of levels to be considered in the transformer-based neural network, and a number of heads to be considered in the mask attention network.

4. A computer-implemented method for processing a sequence of data items by a particular transformer at a particular level in a stack of transformers of a transformer-based neural network, the method comprising:

receiving the sequence of data items provided by an application;

in a first neural network in a pipeline of neural networks of the particular transformer, processing the sequence of data items using a mask attention network to produce a first output result, the mask attention network performing operations of:
generating an original attention data structure that expresses influence between pairs of data items in the sequence of data items;
dynamically generating a mask data structure that is that a mask that contains mask values, a particular mask value of the mask values being produced by determining a separation between a particular pair of data items in the sequence of data items at the particular level, selecting and retrieving a distance-related machine-trained value based on the separation between the particular pair of data items that has been determined, and determining the particular mask value based, in part, on the machine-trained value,
the machine-trained value that is selected and retrieved being independent of meanings of the particular pair of data items,
the distance-related machine-trained value being selected and retrieved from a stored set of distance-related machine-trained values associated with different respective separations between pairs of data items and for different levels,
a training system having previously produced the stored set of distance-related machine-trained values for the different respective separations by iteratively operating on a set of training examples to achieve a training objective; and producing a modified attention data structure by modifying the original attention data structure by the mask values provided by the mask data structure;

processing the first output result using another attention network that does not use a mask data structure and the stored set of distance-related machine-trained values associated with different separations, to provide a second output result, said another attention network being a second neural network that follows the first neural network in the pipeline; and processing the second output result by a feed-forward neural network to produce a third output result, the feed-forward neural network being a third neural network that follows the second neural network in the pipeline, the method having a resource-efficiency that depends on a number of machine-trained values that are used to generate the mask data structure.

5. The computer-implemented method of claim 4,
wherein the mask data structure is used in a particular head of the transformer-based neural network at the particular level, and
wherein the particular mask value for the particular pair of data items at the particular level is formed by summing an encoding of one data item of the particular pair of data items multiplied by a machine-trained weight matrix, the distance-related machine-trained value associated with a separation between the particular pair of data items, and a machine-trained value associated with the particular head.

6. The computer-implemented method of claim 4, wherein the number of machine-trained values used to generate the mask data structure depends on a number of words in the sequence of data items, a number of levels to be considered in the transformer-based neural network, and a number of heads to be considered in the mask attention network.

7. The computer-implemented method of claim 4, wherein the transformer-based neural network is used in an encoder and a decoder that cooperatively transform the sequence of data items from a first form to a second form.

8. The computer-implemented method of claim 4, wherein the transformer-based neural network is used in an encoder that transforms the sequence of data items into a semantic vector and/or a classification result.

9. The computer-implemented method of claim 4, wherein the application is a search application.

10. One or more computing devices for processing a sequence of data items, comprising:
a transformer-based neural network including neurons implemented by resources of hardware logic circuitry,
the transformer-based neural network having a stack of transformers, a particular transformer at a particular level of the transformer-based neural network performing operations of:
receiving the sequence of data items provided by an application;
in a first neural network in a pipeline of neural networks of the particular transformer, processing the sequence of data items using the mask attention network to produce a first output result,
the mask attention network performing operations of:
generating an original attention data structure that expresses influence between pairs of data items in the sequence of data items;
dynamically generating a mask data structure that is a mask that contains mask values, a particular mask value being produced by determining a separation between a particular pair of data items in the sequence of data items at the particular level, selecting and retrieving a distance-related machine-trained value based on the separation between the particular pair of data items that has been determined, and determining the particular mask value based, in part, on the machine-trained value, the machine-trained value that is selected and retrieved being independent of meanings of the particular pair of data items, the machine-trained value being used for any pairing of data items having a same separation as the separation between the particular pair of data items, the distance-related machine-trained value being selected and retrieved from a stored set of distance-related machine-trained values associated with different respective separations between pairs of data items and for different levels, a training system having previously produced the stored set of distance-related machine-trained values for different respective separations by iteratively operating on a set of training examples to achieve a training objective; and producing a modified attention data structure by modifying the original attention data structure by the mask values provided by the mask data structure;

processing the first output result using another attention network that does not use a mask data structure and the stored set of distance-related machine-trained values associated with different separations, to provide a second output result, said another attention network being a second neural network that follows the first neural network in the pipeline; and processing the second output result by a feed-forward neural network to produce a third output result, the feed-forward neural network being a third neural network that follows the second neural network in the pipeline, the method having a resource-efficiency that depends on a number of machine-trained values that are used to generate the mask data structure.

11. The one or more computing devices of claim 10,
wherein the mask data structure is used in a particular head of the transformer-based neural network at the particular level, and
wherein the particular mask value for the particular pair of data items at the particular level is formed by summing an encoding of one data item of the particular pair of data items multiplied by a machine-trained weight matrix, the distance-related machine-trained value associated with the separation between the particular pair of data items, and a machine-trained value associated with the particular head.

12. The computer-readable storage medium of claim 1, wherein the original attention data structure depends on a product of a query matrix and a key matrix, and wherein the modified attention matrix is produced by multiplying the original attention data structure by the mask data structure.

13. The computer-readable storage medium of claim 12, wherein, for the particular level, a particular head, and the particular pair of data items, the particular mask value in the mask data structure is a sum of an encoding of one data item of the particular pair of data items multiplied by a machine-trained weight matrix, the distance-related machine-trained value associated with a separation between the particular pair of data items, and a machine-trained value associated with the particular head.

14. The computer-implemented method of claim 4, wherein the original attention data structure depends on a product of a query matrix and a key matrix, and wherein the modified attention matrix is produced by multiplying the original attention data structure by the mask data structure.

15. The computer-implemented method of claim 14, wherein, for the particular level, a particular head, and the particular pair of data items, the particular mask value in the mask data structure is a sum of an encoding of one data item of the particular pair of data items multiplied by a machine-trained weight matrix, the distance-related machine-trained value associated with a separation between the particular pair of data items, and a machine-trained value associated with the particular head.

16. The one or more computing devices of claim 10, wherein the original attention data structure depends on a product of a query matrix and a key matrix, and wherein the modified attention matrix is produced by multiplying the original attention data structure by the mask data structure.

17. The one or more computing devices of claim 16, wherein, for the particular level, a particular head, and the particular pair of data items, the particular mask value in the mask data structure is a sum of an encoding of one data item of the particular pair of data items multiplied by a machine-trained weight matrix, the distance-related machine-trained value associated with a separation between the particular pair of data items, and a machine-trained value associated with the particular head.

18. The computer-readable storage medium of claim 1, wherein the particular mask value depends on a hidden state of a first of the particular pair of data items, and is independent of a hidden state of a second of the particular pair of data items.

19. The computer-implemented method of claim 4, wherein the particular mask value depends on a hidden state of a first of the particular pair of data items, and is independent of a hidden state of a second of the particular pair of data items.

20. The or more computing devices of claim 10, wherein the particular mask value depends on a hidden state of a first of the particular pair of data items, and is independent of a hidden state of a second of the particular pair of data items.

* * * * *